United States Patent [19]
Javan et al.

[11] 3,809,887
[45] May 7, 1974

[54] APPARATUS AND METHOD FOR CONTROLLING DIRECTION OF RADIATION

[75] Inventors: Ali Javan, Cambridge; Michael S. Feld, Newton Center, both of Mass.

[73] Assignee: Massachusetts Institute of Technology, Cambridge, Mass.

[22] Filed: Sept. 5, 1972

[21] Appl. No.: 286,091

[52] U.S. Cl. .................................. 250/199, 330/4.3
[51] Int. Cl. .............................................. H04b 9/00
[58] Field of Search ...................... 250/199; 330/4.3; 332/7.51; 356/28, 106; 331/94.5 A, 94.5 C, 94.5 F, 94.5 G

[56] References Cited

UNITED STATES PATENTS

| | | | |
|---|---|---|---|
| 3,471,803 | 10/1969 | Forster | 356/28 |
| 3,473,031 | 10/1969 | White | 330/4.3 X |
| 3,594,659 | 7/1971 | Brandli et al. | 250/199 |
| 3,687,517 | 8/1972 | Brun | 250/199 X |

*Primary Examiner*—Benedict V. Safourek
*Attorney, Agent, or Firm*—Arthur A. Smith, Jr.; Martin Santa; John N. Williams

[57] ABSTRACT

The invention features the use of atomic systems resonant in one or more Doppler broadened transitions which are biased by a radiation field having a frequency within the range of one transition to produce anisotropic radiation transmission properties through the atomic systems. Embodiments of the invention feature an isolating amplifier operating in a communication system and an isolation cell preventing reradiation into a radiation source.

7 Claims, 8 Drawing Figures

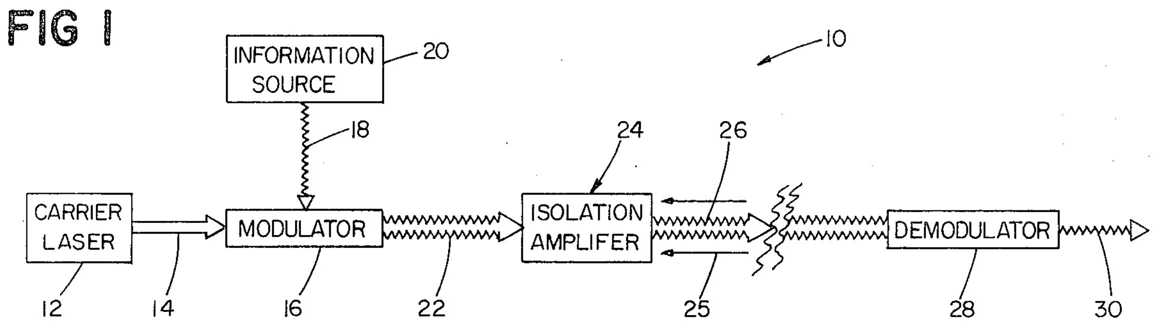
FIG I
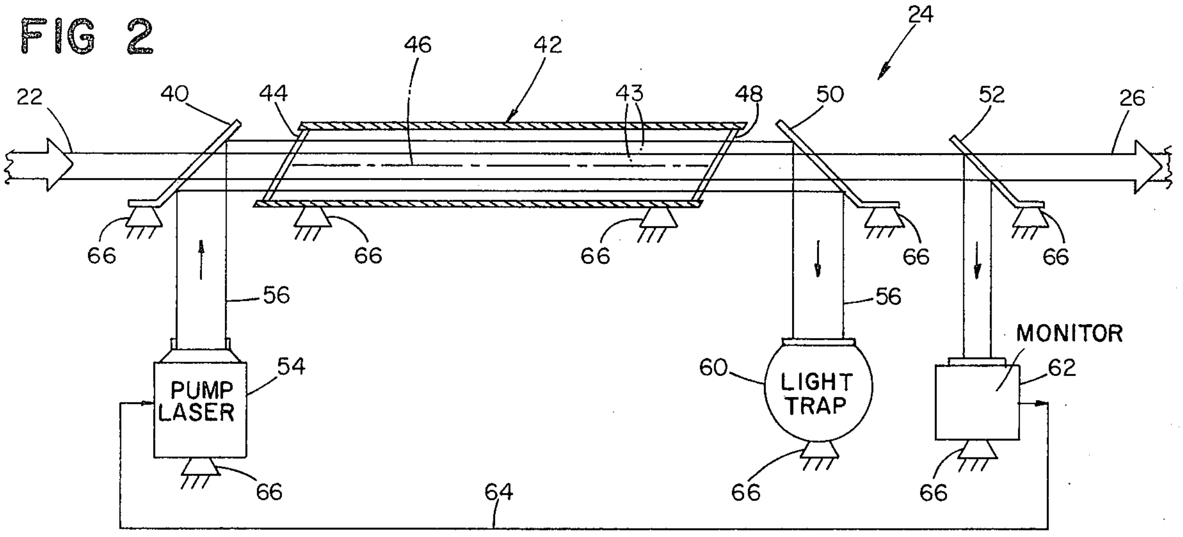
FIG 2

APPARATUS AND METHOD FOR CONTROLLING DIRECTION OF RADIATION

This invention relates to isolating radiation sources from radiation reflected or scattered back toward the source. Isolation of a radiation source is particularly important in communication systems where back returned radiation, if it enters the amplifying elements of the source, can establish spurious feedback loops which degrade system performance.

The invention features the use of atomic systems resonant in one or more Doppler broadened transitions which are biased by a radiation field having a frequency within the range of one transition to produce anisotropic radiation transmission properties through the atomic systems. Embodiments of the invention feature an isolating amplifier operating in a communication system and an isolation cell preventing reradiation into a radiation source.

BACKGROUND OF THE INVENTION

To aid in describing an exemplary embodiment of the invention it will be convenient to explain the anisotropic gain which plays a prominent role in the invention. The anisotropic gain property discussed here is intimately related to the Doppler effect and occurs only in Doppler-broadened resonances in a gas. We shall first give a qualitative discussion of the effect.

Consider a three-level atomic system ("atomic system" being used as a term comprehending both molecules and single atoms) giving rise to a pair of Doppler-broadened transitions sharing a common level. The levels will be designated 0, 1, and 2 with level 0 the common level. The common level may be energetically the highest, lowest or the middle level, but we shall here primarily consider the case where it is the highest level. An example is the HF molecular system shown in FIG. 3, taking the 0-level as the (V=1, J=4) molecular state; the 1-level as the (V=0, J=5) state; and the 2-level as the (V=0, J=3) molecular state, where V and J are the conventionally employed vibration and rotation quantum numbers. At thermal equilibrium both transitions will have negative gain (i.e. be absorbing). When a saturating (i.e. intense enough to alter populations of states) traveling-wave laser field resonating with the (2-0) transition is applied to the gas, it selectively changes the population of the common level (level 0) only over a narrow section of the thermal velocity distribution. This comes about because only the molecules whose velocities can Doppler shift the laser frequency into exact resonance interact strongly with the laser field. The increase of population of the upper level produces in turn an increase in gain (i.e. decrease in absorption) at the coupled (1-0) transition. Consider the frequency of the saturating laser field (the pump or biasing field) to be detuned from the center frequency of the (2-0) transition by an amount larger than the homogeneous width. In order for the effect we consider to occur, the Doppler width must be considerably greater than the homogeneous width due to collision, radiative decay etc. The temperature and pressure range for which this condition is satisfied can be ascertained from well known relationships in any given system. Let us now consider the gain profile at the coupled transition (1-0) with respect to radiation (i.e. the probe field) collinear with the laser field. In this case the perturbation in the (1-0) gain profile occurs over a narrow frequency interval with its center frequency dependent on the direction of the probe field relative to that of the pump laser field. This dependency is due to the Doppler shift of the probe field frequency, which changes sign as the propagation direction of the probe field is reversed. Let (+) designate the situation where the probe propagation is in the direction of the pump field and (−) the reverse direction. For the probe field propagating in the (+) direction, the narrow change in gain profile is centered at $$F_1^+ = F_1 + (f_1/f_2)(F_p - f_2) \quad (1)$$

while for the (−) direction, it is centered at $$F_1^- = f_1 - (f_1/f_2)\ (F_p - f_2) \quad (2)$$

Here $f_1$ and $f_2$ are the center frequencies of the (1-0) and (2-0) transitions, respectively, and $F_p$ is the pump laser frequency. These equations follow directly from the Doppler effect and when the frequencies $F_p$ and $F_1^+$ (or $F_1^-$) conform to these equations we shall say the probe and pump frequencies are equivalently shifted. To emphasize the directionality of the effect, we consider $F_p$ to be sufficiently detuned from $f_2$ so that the overlapping of the two perturbations centered at $F_1^+$ and $F_1^-$ can be ignored (FIG. 4). In this case we note that when increase in gain occurs for a wave of a given frequency propagating in the (+) direction, it will not occur for a wave of the same frequency propagating in the (−) direction; and vice versa (see FIG. 4). Proceeding still with qualitative discussions we note that the exact magnitude of the change in the (1-0) gain profile is determined not only by a change in the level populations, but also by additional radiative processes which include two-quantum Raman transitions between levels 2 and 1, with level 0 as a resonant intermediate state. As a result of the two-quanta effects there arise two different cases: For co-propagating fields and when the common energy level (the 0-level) is the highest of the three levels, [(FIG. 4(*a*)], the width of the perturbation in the (1-0) gain profile is narrower and its magnitude larger than for the corresponding perturbation for contra-propagating fields [FIG. 4(*b*)]. However, the areas (i.e., magnitude *x* frequency) of the two perturbations are always equal.

As the intensity of the pump field is increased, the magnitudes of the perturbations in the gain profile may increase sufficiently to change the sign of the gain, resulting in directionally dependent amplification within narrow frequency intervals: For co-propagation, the interval with positive gain is centered at $F_1^+$; for contra-propagation, it is centered at $F_1^-$. Because of the different heights of the two directionally dependent perturbations in the (1-0) gain profile, however, the magnitude of the gain differs for the two directions. In particular, as the pump field intensity is increased, the reversal in the sign of the gain first appears at $F_1^+$ for co-propagation, where the magnitude of the effect is largest [FIG. 2(*a*)]. In this case, gain is obtained only for co-propagating waves while for contra-propagating waves the (1-0) transition remains in the absorbing phase within its entire Doppler broadened profile. A more detailed and quantitative analysis of the physical phenomena discussed above is given in a paper by M. S. Feld and A. Javan: Physical Review Vol. 177, p. 540ff.

BRIEF DESCRIPTION OF THE DRAWING

FIG. 1 shows in block diagram form a communication system employing the invention.

FIG. 2 shows the isolating amplifier of FIG. 1 in detail.

DESCRIPTION OF EMBODIMENTS

Figure 3:
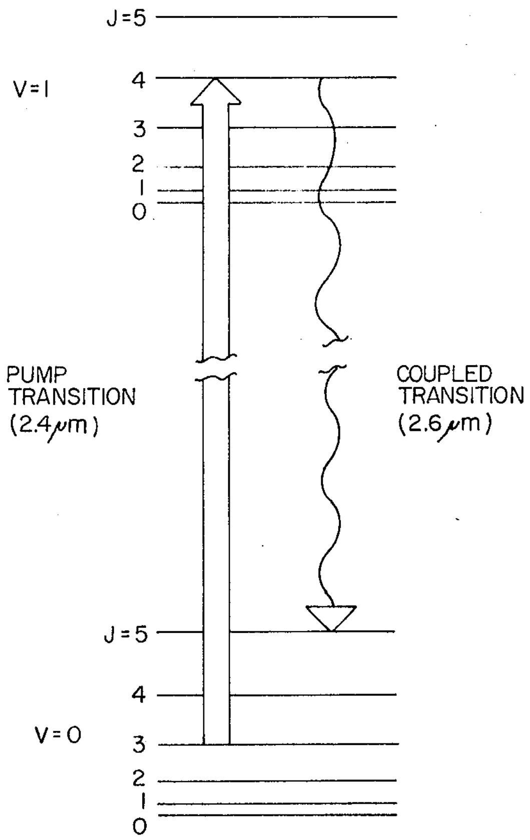
FIG. 3 shows diagrammatically energy levels and transitions in molecules incorporated in the amplifier of FIG. 2.
Figure 4A:
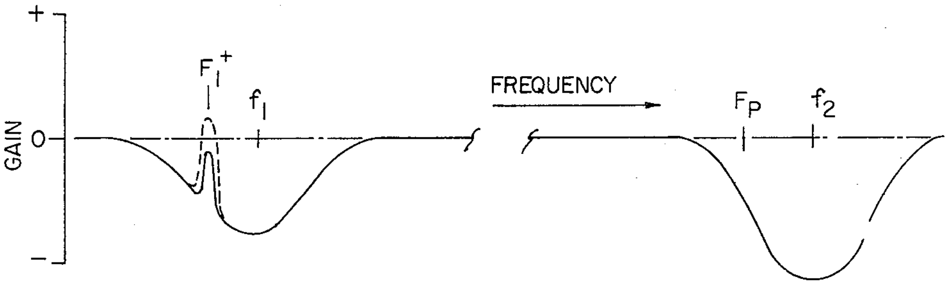
FIGS. 4*a* and 4*b* show the gain as a function of frequency for the transitions shown in FIG. 3.
Figure 4B:
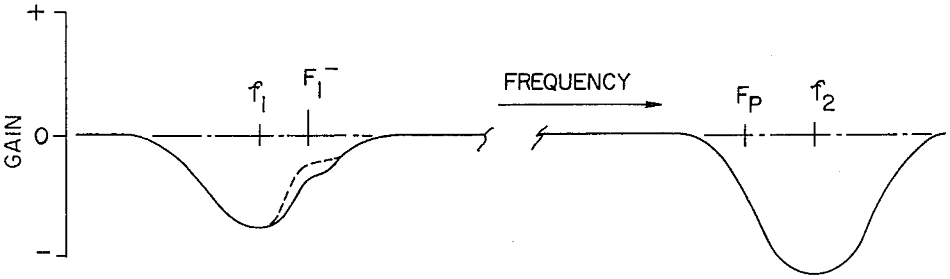

Turning now to an exemplary embodiment of the invention, and referring particularly to FIG. 1, communications system 10 includes carrier generator unit 12 which may conveniently be a hydrogen fluoride gas laser oscillating stabilized and continuously in the vibration-rotation transition between the V=1, J=4 state and the V=0, J=5 state (2.6 microns wavelength). Apparatus for such a generator is well known and need not be further discussed. Radiation beam 14 emitted from generator 12 passes to modulator 16. Cable 18 carrying an information signal from information source 20 is connected to modulator 16. Modulator 16 may be for example a gallium arsenide electro-optic device for modulation of the laser according to the information signal. Such devices are well known and need no further discussion. Modulated laser beam 22 passes from modulator 16 to isolation amplifier 24 (described more fully below) which amplifies the outgoing modulated carrier beam for transmission in beam 26 while blocking any scattered or reflected radiation 25 from reentering the transmission apparatus. Demodulator 28 receives beam 26 from isolation amplifier 24 and demodulates it, recovering the information signal in electrical form. Demodulator devices are known and may be for example Indium-doped germanium detectors cooled to liquid He temperatures.

Turning to the details of amplifier 24 and referring particularly to FIG. 2, modulated beam 22 enters isolation amplifier 24 and passes through beam splitter 40, then enters amplifying cell 42 through entrance window 44, and passes through cell 42 along path 46 to exit window 48. Exiting from window 48, the beam continues through beam splitter 50 and beam splitter 52 to emerge as beam 26. Tunable pump laser 54 emits beam 56 which is reflected by beam splitter 40 to enter cell 42 and pass therethrough along path 46. After emerging from cell 42, beam 56 is reflected by beam splitter 50 into radiation trap 60 where it is absorbed. A small fraction of beam 26 is deflected by beam splitter 52 into monitor 62 which samples the amplitude of beam 26 and produces a signal passing through control link 64 to adjust the frequency of laser 54 as will be further described below. Cell 42, laser 54, trap 60, monitor 62, and beam splitters 40, 50, and 52 are conveniently supported on a common frame 66 maintaining the alignment of the several components.

In the described embodiment, cell 42 has a diameter 1 centimeter and is 20 centimeters long. It is filled with room temperature hydrogen fluoride atomic systems 43 at a pressure of 0.04 torr. In general for other atomic systems or transitions the operating pressure should be chosen with regard to the relevant transition strength and the intensity of the pumping beam. The basic consideration that the transition breadth must be essentially determined by Doppler effects must of course also be kept in mind. Windows 44 and 48 are made of quartz and are advantageously set at the Brewster angle to maximize the transmission of radiation. The inner surfaces of the windows are advantageously coated with halogen grease to reduce attack by the hydrogen fluoride gas. Beam splitters 40 and 50 are advantageously of the dielectric layer type to achieve maximum transmission of the through beam with maximum reflection of the reflected beam which is of a slightly different frequency as will be described below. Pump laser 54 is, in the described embodiment, a hydrogen fluoride gas laser emitting continuously on the transition from the (V=1, J=4) to (V=0, J=3) of the hydrogen fluoride molecule.

In operation carrier laser 12 is stabilized to operate at a frequency detuned from the center value of its transition. In passing through modulator 16, the beam from the carrier laser is modulated by the information signal so that it emerges in beam 22 with information-bearing modulation. Pump laser 54 is similarly detuned to operate a corresponding amount as given by equation (1) off the center frequency of its emission transition. Radiation beam 56 emitted by laser 54 therefore on entering cell 42 interacts selectively with the hydrogen fluoride molecules having velocities appropriate to Doppler shift the radiation in beam 56 into resonance with the molecular system. In accordance with the explanation given above, a velocity dependent population change will be expected putting the hydrogen fluoride gas in a lasing condition for appropriately Doppler shifted radiation of the coupled transition from (V=1, J=4) to (V=0, J=5) states. Incoming beam 22 carrying the information will therefore be amplified as it passes along path 46 through cell 42 to emerge with greater amplitude in beam 26 for transmission to a receiver station. The effective operation of the amplifier requires that the frequency condition of Equation (1) be maintained. A small fraction of the energy from beam 26 is therefore diverted by beam splitter 32 into monitor 62. Monitor 62 senses the amplitude of the radiation it receives and exercises automatic control over the tuning of pump laser 54 to maximize the amplitude of beam 26, thereby maintaining the frequency condition defined by Equation (1).

Figure 5:
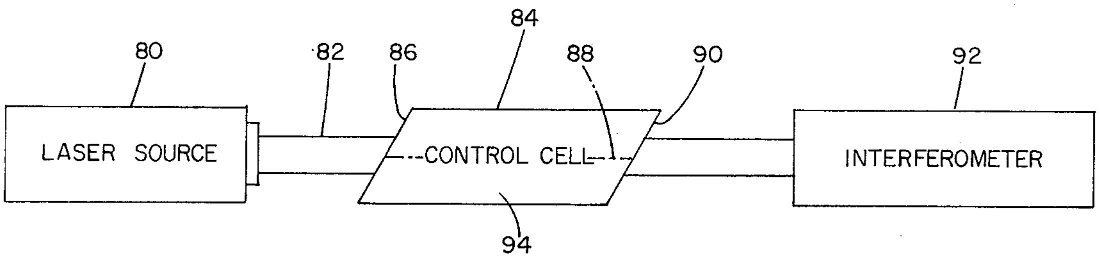
FIG. 5 shows another embodiment of the invention.
Figures 6A, 6B:
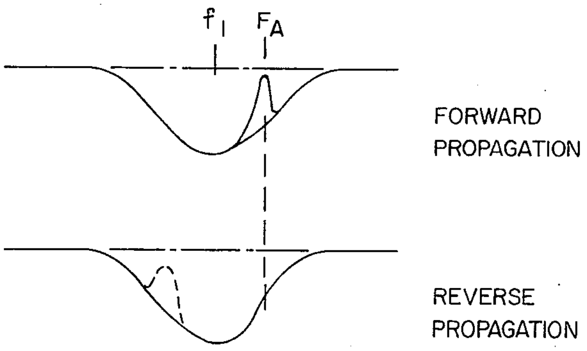
FIGS. 6*a* and 6*b* show absorption profiles related to the embodiment of FIG. 5.

Another embodiment of the invention shown in FIG. 5 includes intense radiation sources 80 which in the described embodiment is identical with source 54 described above with a radiation amplifier such as a laser emitting radiation in a spectral line. A beam of radiation from source 80 is emitted through port 82 which directs the beam through entrance window 86 of control cell 84. Thence along a non-reentrant path 88, in cell 84, out through exit window 90 and into utilization device 92 having reflective elements incorporated therein. Device 92 might for example be an interferometer. Cell 84 is identical with cell 42 described above.

In operation the radiation from sources 80 in propagating through cell is 84 is initially strongly absorbed, (see FIG. 62 showing as a solid line the initial absorption.), but in being absorbed it stimulates transitions in the HF molecules having the particular velocity to shift the beam frequency into resonance. For molecules at the resonant velocity therefore the populations of upper and lower states of the transition are altered and the gas becomes much less absorptive (the dotted line of FIG. *6a*). The operation may be visualized as one in which the radiation burns a hole in the absorber. At the same time returned radiation propagating in the opposite direction is not in resonance with the molecules reacting with the forward propagating radiation but rather is in resonance with molecules moving in the opposite direction which have the normal populations (FIG. *6b*). The return radiation is thus strongly absorbed and does not penetrate the cells to return to the source.

We claim:

1. Radiation direction control apparatus comprising an isolation cell having an entrance window for admitting radiation of a frequency to be controlled, an exit window for emitting radiation of said frequency, and a transmission path extending between said entrance and said exit window, said cell including atomic systems dispersed in said path which are radiatively reactive in a first transition resonance between a first and a second energy state and a second transition resonance between first and a third energy state, the atomic systems being in a gas with temperature and pressure such that the spectral breadth of said resonances in said cell are determined by Doppler broadening, said second transition resonance extending spectrally over a range including said frequency to be controlled, a biasing radiation source for emitting a beam of radiation of a saturating intensity in a spectral line and directing said beam into said cell and along said path, said line having a spectral breadth less than the spectral breadth of said first transition resonance and a line center at a frequency spectrally within said first resonance while displaced from the center thereof, said beam stimulating transitions between said energy states in such of said atomic systems only as have a velocity component along said path in one direction and making said cell anisotropic in its transmission properties to radiation of said frequency to be controlled, said radiation passing through said cell with a gain greater in the direction from said entrance to said exit window than in the direction from said exit to said entrance window.

2. Apparatus as in claim 1 including means responsive to radiation transmitted through said cell for controlling the frequency of said biasing source to maintain said source frequency and said frequency to be controlled equivalently shifted.

3. A one-way radiation amplifier comprising a transmission cell having an entrance window for admitting radiation of a frequency to be controlled, an exit window for emitting radiation of said frequency, and a transmission path extending between said entrance and said exit window, said cell including atomic systems dispersed in said path which are radiatively absorptive in a first transition resonance between a first and a second energy state and in a second transition resonance between said first and a third energy state, the atomic systems being in a gas with temperature and pressure such that the spectral breadth of said resonances in said cell are determined by Doppler broadening, said second transition extending spectrally over a range including said to-be-controlled frequency, a biasing radiation source for emitting a beam of radiation in a spectral line and directing said beam from said biasing source into said cell and along said path, said line having a spectral breadth less than the spectral breadth of said first transition resonance and a line center at a frequency spectrally within said first resonance while displaced from the center thereof, and said beam stimulating transitions in such of said atomic systems only as have a velocity component along said path in one direction and making said cell amplifying in its transmission of radiation of the controlled frequency propagating from said entrance to said exit window while leaving said cell absorptive for radiation propagating from said exit to said entrance window.

4. A communication system comprising an isolation cell having an entrance window for admitting radiation of a frequency to be controlled, an exit window for emitting radiation of said frequency, and a transmission path extending between said entrance and said exit window, said cell including atomic systems dispersed in said path which are radiatively reactive in a first transition resonance between a first and second energy state and a second transition resonance between said first and a third energy state, the atomic systems being in a gas with temperature and pressure such that the spectral breadth of said resonances in said cell is determined by Doppler broadening, means for generating an information-modulated beam of radiation of a frequency situated within said second resonance and for directing said modulated beam along said path from said entrance window to said exit window, a biasing radiation source for emitting a beam of radiation in a spectral line and directing said beam from said biasing source into said cell and along said path, said line having a spectral breadth less than the spectral breadth of said first resonance and a line center at a frequency spectrally within said first resonance while displaced from the center thereof, and means responsive to said modulated beam generating means and to said biasing source for maintaining said modulated beam frequency and said biasing source frequency equivalently shifted, said biasing beam making said cell anisotropic in its transmission properties to that radiation of said modulated beam frequency will pass through said cell along said path with a greater gain in the direction from said entrance to said exit window than in the direction from said exit to said entrance window.

5. Apparatus as in claim 4, said biasing source emitting radiation at a level to induce positive gain in said cell at said modulated beam frequency whereby said modulated beam is amplified in passing through said cell from said entrance to said exit window.

6. Radiation control apparatus for isolating a source from a utilization device comprising a transmission cell having an entrance window for admitting radiation, an exit window for emitting radiation, and a non-reentrant transmission path extending between said entrance and said exit window, said cell including atomic systems dispersed in said path which are radiatively absorptive in a transition resonance between a first and second energy state, the atomic systems being in a gas with temperature and pressure such that the spectral breadth of said resonance in said cell being determined by Doppler broadening, a source including a radiation amplifier for emitting radiation in a spectral line and directing a beam into said cell and along said path, said line having a spectral breadth less than the spectral breadth of the Doppler broadened resonance and a line center at a frequency spectrally within said Doppler broadened resonance while displaced from the center thereof, radiation utilization means disposed to receive radiation from said cell including elements reflecting incoming radiation back toward said source, said radiation in propagating through said cell stimulating transitions between said energy states in such of said atomic systems as have a particular velocity along said path and making said cell anisotropic in its transmission properties so that radiation of said spectral line will pass through said cell along said path with a greater gain in the direction from said entrance to said exit window than in the direction from said exit to said entrance window.

7. A method for amplifying a first beam of forwardly propagating radiation of a predetermined frequency while blocking backwardly propagating radiation of said frequency comprising interposing in said beam a multiplicity of like atomic systems with a velocity distribution, said systems being absorptive in a first transition resonance between a first and second energy state and in a second transition resonance between said first and a third energy state, the spectral width of said resonances being determined by Doppler broadening, said second resonance extending spectrally over a range including said predetermined frequency, causing a second beam, of biasing radiation, to propagate through said atomic systems in a direction colinear with said first beam, (either in the same sense or oppositely thereof), said biasing radiation having a spectral breadth less than that of said first resonance and being situated spectrally within said first resonance, said biasing radiation being of an intensity to alter the ratio of populations in said first and second states, and maintaining a ratio of spectral displacement of the biasing frequency from the center of said first resonance to the spectral displacement of said predetermined frequency from the center of said second resonance equal to the ratio of the center frequency of the first resonance to that of the second resonance.

* * * * *

UNITED STATES PATENT OFFICE
CERTIFICATE OF CORRECTION

Patent No. 3,809,887 Dated May 7, 1974

Inventor(s) Ali Javan and Michael S. Feld

It is certified that error appears in the above-identified patent and that said Letters Patent are hereby corrected as shown below:

Insert as the first paragraph in column 1:

--The invention herein described was made in the course of work performed under contract with the Department of the Army, the Department of the Navy, and the Air Force.--

Signed and sealed this 22nd day of October 1974.

(SEAL)
Attest:

McCOY M. GIBSON JR.
Attesting Officer

C. MARSHALL DANN
Commissioner of Patents